(12) United States Patent
Takebayashi et al.

(10) Patent No.: US 11,926,325 B2
(45) Date of Patent: Mar. 12, 2024

(54) VEHICLE CONTROL APPARATUS

(71) Applicant: SUBARU CORPORATION, Tokyo (JP)

(72) Inventors: Yosuke Takebayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 17/476,127

(22) Filed: Sep. 15, 2021

(65) Prior Publication Data

US 2022/0089161 A1 Mar. 24, 2022

(30) Foreign Application Priority Data

Sep. 24, 2020 (JP) .................................. 2020-159716
Apr. 26, 2021 (JP) .................................. 2021-073946

(51) Int. Cl.
*B60W 30/18* (2012.01)

(52) U.S. Cl.
CPC ... *B60W 30/18145* (2013.01); *B60W 2510/20* (2013.01); *B60W 2520/10* (2013.01); *B60W 2520/12* (2013.01); *B60W 2552/30* (2020.02); *B60W 2710/18* (2013.01); *B60W 2720/106* (2013.01); *B60W 2720/125* (2013.01)

(58) Field of Classification Search
CPC ....... B60W 30/18145; B60W 2552/30; B60W 2510/20; B60W 2520/10; B60W 2520/12; B60W 2710/18; B60W 2720/106; B60W 2720/125

See application file for complete search history.

(56) References Cited

U.S. PATENT DOCUMENTS

| 11,352,000 | B2* | 6/2022 | Aso ..................... G01C 21/3407 |
| 2004/0111209 | A1* | 6/2004 | Kagawa ............. B60K 31/0058 |
| | | | 701/93 |
| 2005/0246091 | A1* | 11/2005 | Kuroda .............. G01C 21/3697 |
| | | | 701/1 |
| 2019/0129437 | A1* | 5/2019 | Liu ........................ B60W 40/02 |
| 2019/0382014 | A1* | 12/2019 | Wang .................. B60W 30/143 |
| 2020/0317219 | A1 | 10/2020 | Yoshida et al. |

(Continued)

FOREIGN PATENT DOCUMENTS

WO 2017/208786 A1 12/2017

*Primary Examiner* — Jeff A Burke
*Assistant Examiner* — Mohamad O El Sayah
(74) *Attorney, Agent, or Firm* — Rimon P.C.

(57) ABSTRACT

A vehicle control apparatus includes a processor. Before the vehicle passes through an inflection point of a curvature of a target trajectory, the processor sets a first reference point before the inflection point. After the vehicle passes through the inflection point, the processor sets a second reference point at a position where a second distance from a current position of the vehicle after the vehicle passes through the inflection point to the second reference point is longer than a first distance from a current position of the vehicle before the vehicle passes through the inflection point to the first reference point when compared under travel conditions identical in a vehicle speed, an acceleration rate, a deceleration rate, or a steering angle. The processor sets a target steering angle based on the curvature of an arc passing through the current position and the first reference point or the second reference point.

5 Claims, 5 Drawing Sheets

(56) References Cited

U.S. PATENT DOCUMENTS

| | | | |
|---|---|---|---|
| 2021/0300470 A1* | 9/2021 | Kitano | G08G 1/0968 |
| 2022/0089180 A1* | 3/2022 | Kim | B60W 60/001 |
| 2023/0211786 A1* | 7/2023 | Peyret | B60W 40/10 701/36 |

* cited by examiner

VEHICLE CONTROL APPARATUS

CROSS-REFERENCE TO RELATED APPLICATIONS

The present application claims priority from Japanese Patent Application Nos. 2020-159716 filed on Sep. 24, 2020 and 2021-073946 filed on Apr. 26, 2021, the entire contents of each of which are hereby incorporated by reference.

BACKGROUND

The disclosure relates to a vehicle control apparatus.

Automatic drive technologies for automatically driving vehicles without requiring driver's operations have been put to practical use. In automatic driving, the vehicle is controlled to travel along a target trajectory. For example, International Publication No. WO 2017/208786 discloses an automatic drive technology in which a reference point is set on a target trajectory of the vehicle with respect to a current position of the vehicle, and the steering operation of the vehicle is controlled on the basis of an arc having a tangent line that extends in an advancing direction of the vehicle and passes through the reference point and the current position.

In a case where the current position of the own vehicle is deviated from the target trajectory, a vehicle control apparatus disclosed in International Publication No. WO 2017/208786 sets the reference point assuming that the own vehicle will move on the target trajectory from a position on the target trajectory near the actual position of the vehicle in a predetermined period of time. In contrast, in a case where the current position of the own vehicle is not deviated from the target trajectory, the vehicle control apparatus disclosed in International Publication No. WO 2017/208786 sets the reference point closer to the current position of the vehicle as the curvature of the arc passing through three points set on the target trajectory increases, whereas sets the reference point farther from the current position of the vehicle as the curvature of the arc approaches zero.

SUMMARY

An aspect of the technology provides a vehicle control apparatus be applied to a vehicle. The vehicle control apparatus includes one or more processors and one or more memories communicably coupled to the one or more processors. Before the vehicle passes through an inflection point of a curvature of a target trajectory, the one or more processors are configured to a first reference point at a position before the inflection point, and set a target steering angle on a basis of a curvature of an arc passing through a current position of the vehicle and the first reference point. After the vehicle passes through the inflection point, the one or more processors are configured to a second reference point as the reference point at such a position where a second distance from a current position of the vehicle detected after the vehicle passes through the inflection point to the second reference point is longer than a first distance from a current position of the vehicle detected before the vehicle passes through the inflection point to the first reference point when compared under identical travel conditions, and set the target steering angle on a basis of a curvature of an arc passing through the current position of the vehicle and the second reference point. The identical travel conditions are identical to each other in at least one of a vehicle speed, an acceleration rate, a deceleration rate, or a steering angle. The one or more processors are configured to control the steering angle on a basis of the target steering angle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In a case where a steering operation of a vehicle is controlled on the basis of an arc having a tangent line that extends in the advancing direction of the vehicle and passes through a reference point and a current position of the vehicle, an actual travel trajectory of the vehicle changes depending on the position where the reference point is set. For example, in a case where the reference point is set too far from the vehicle entering a curve, the actual travel trajectory of the vehicle can deviate inwardly from the target trajectory while the vehicle is traveling on the curve. In contrast, in a case where the reference point is set too close to the vehicle entering a straight road from the curve, the curvature of the arc of the actual travel trajectory becomes greater than that of the target trajectory, resulting in steering fluctuations. However, the technique disclosed in International Publication No. WO 2017/208786 fails to take into consideration of these different concerns that can be generated when the vehicle is entering a curve and when the vehicle is exiting from the curve. Thus, the vehicle control apparatus disclosed in International Publication WO 2017/208786 can find it difficult to address the concerns described above.

It is desirable to provide a vehicle control apparatus and a control method that make it possible to reduce the deviation of an actual travel trajectory from a target trajectory and to reduce steering fluctuations.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Exemplary Configuration of Vehicle

Now described is an exemplary configuration of a vehicle 1 including a vehicle control apparatus according to an example embodiment of the technology.

Figure 1:
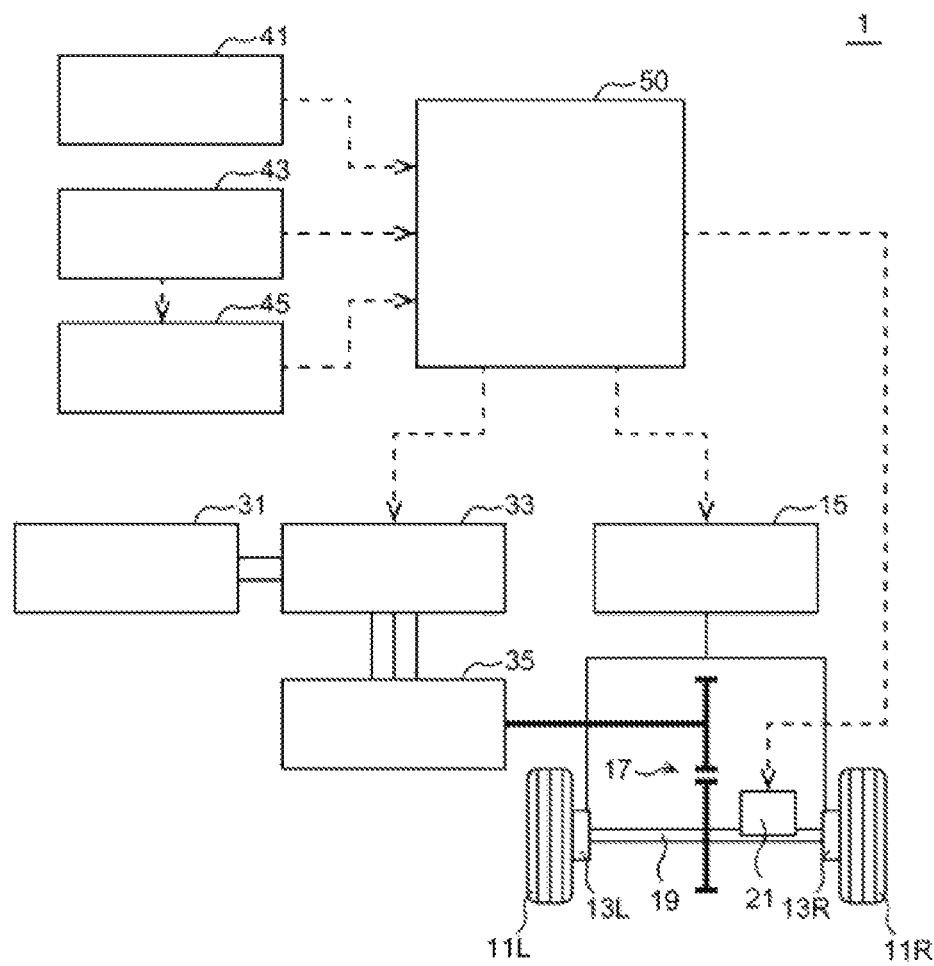
FIG. 1 is a block diagram schematically illustrating an exemplary configuration of a vehicle including a vehicle control apparatus according to one example embodiment of the technology.

FIG. 1 schematically illustrates the exemplary configuration of the vehicle 1. The vehicle 1 may include drive wheels 11L and 11R, a drive power transfer system 17, a drive motor 35, an inverter 33, a battery 31, a brake system 15, an electric steering system 21, a vehicle operation-behavior sensor 41, a vehicle position sensor 43, a navigator 45, and a vehicle control apparatus 50. The inverter 33, the brake system 15, the electric steering system 21, the vehicle operation-behavior sensor 41, the vehicle position sensor 43, and the navigator 45 may be coupled to the vehicle control apparatus 50 in a direct manner or with a communication means, such as a controller area network (CAN) or local internet (LIN).

The vehicle 1 illustrated in FIG. 1 may be an electric vehicle including the drive motor 35 as a sole drive source. The vehicle 1 may travel using drive power outputted from the drive motor 35. The drive mode of the vehicle 1 may be switched between a manual drive mode and an automatic drive mode. In the manual drive mode, the acceleration rate, the deceleration rate, and the steering angle of the vehicle 1 may be controlled on the basis of a driving operation performed by a driver. In the automatic drive mode, the acceleration rate, the deceleration rate, and the steering angle of the vehicle 1 may be automatically controlled without requiring a driving operation performed by the driver.

The drive mode of the vehicle 1 may be switched in response to an operation performed by the driver. For example, the vehicle 1 may be switched from the manual drive mode to the automatic drive mode by the vehicle control apparatus 50 in response to an operation performed by the driver. While traveling in the automatic drive mode, the vehicle 1 may be switched from the automatic drive mode to the manual drive mode in response to a predetermined operation, such as a braking operation, performed by the driver.

The drive motor 35 may output drive power to be transferred to the drive wheels 11L and 11R of the vehicle 1. The drive motor 35 may be a three-phase AC motor, for example. The drive motor 35 may be coupled to the battery 31 via the inverter 33. The drive motor 35 may be driven by electric power received from the battery 31 and output drive power. The drive motor 35 may be regeneratively driven when the vehicle 1 is decelerated, and generate electric power using kinetic energy of the drive wheels 11L and 11R. In this case, the electric power generated by the drive motor 35 may be sent through the inverter 33 to the battery 31.

The drive motor 35 may have an output shaft coupled to a drive shaft 19 with the drive power transfer system 17. The drive shaft 19 may be coupled to the drive wheels 11L and 11R. Thus, the drive power outputted from the drive motor 35 may be transferred to the drive wheels 11L and 11R via the drive power transfer system 17 and the drive shaft 19.

The drive wheels 11L and 11R illustrated in FIG. 1 may be front wheels whose steering angles are controlled by the electric steering system 21. The drive power outputted from the drive motor 35 may be transferred to at least these front wheels. Alternatively, the drive wheels 11L and 11R may be rear wheels to which the drive motor 35 outputs the drive power. Still alternatively, the drive power outputted from the drive motor 35 may be transmitted to both the front wheels and the rear wheels via a non-illustrated propeller shaft.

The inverter 33 may be a bidirectional power converter. For example, the inverter 33 may include a three-phase bridge circuit. The inverter 33 may convert direct current (DC) power received from the battery 31 into alternate current (AC) power, and send the AC power to the drive motor 35. Further, the inverter 33 may convert AC power generated by the drive motor 35 into DC power, and send the DC power to the battery 31. The driving of the inverter 33 may be controlled by the vehicle control apparatus 50.

The battery 31 may be a rechargeable/dischargeable battery. Examples of the battery 31 may include a lithium-ion battery, a lithium-ion polymer battery, a nickel-hydrogen battery, a nickel-cadmium battery, and a lead storage battery. Alternatively, the battery 31 may be a battery other than these batteries. The battery 31 may accumulate electric power supplied to the drive motor 35.

The brake system 15 may control brake force applied to each of the drive wheels 11L and 11R by controlling the hydraulic pressure to be supplied to brake devices 13L and 13R respectively provided in the drive wheels 11L and 11R, for example. The brake system 15 may include a master cylinder, a booster, and a hydraulic control unit that are not illustrated in the drawings. The master cylinder may be coupled to the brake pedal via the booster. The booster may boost the stepping force applied to the brake pedal by the driver, and transfer the resultant power to the master cylinder.

The master cylinder and the brake devices 13L and 13R may be coupled to each other via hydraulic pressure circuitry provided in the hydraulic control unit. The master cylinder may supply the hydraulic pressure circuitry with hydraulic oil in an amount corresponding to the operation quantity of the brake pedal. The hydraulic control unit may include a solenoid valve and an electric pump. The hydraulic control unit may control the flow rate of the hydraulic oil to be supplied to each of the brake devices 13L and 13R.

The brake devices 13L and 13R respectively provided at the drive wheels 11L and 11R may each include a caliper including paired brake pads and a wheel cylinder. The paired brake pads may be disposed adjacent to the respective surfaces of a brake disc so as to face each other. The brake disc may rotate integrally with the drive wheel 11L or the 11R. The wheel cylinder may be a hydraulic chamber formed inside the brake caliper. As the pressure inside the wheel cylinder increases, each brake pad may move toward the corresponding surface of the brake disc. The brake disc may be thereby held between the paired brake pads, generating frictional force. The frictional force may be applied to the drive wheel 11L or 11R as brake force.

The hydraulic control unit may adjust the pressure inside the wheel cylinder in each of the brake devices 13L and 13R by controlling the flow rate of the hydraulic oil to be supplied to each of the brake devices 13L and 13R. The brake force to be applied to the drive wheels 11L and 11R may be thereby controlled. The driving of the brake system 15 may be controlled by the vehicle control apparatus 50.

The electric steering system 21 may assist a steering operation performed by the driver using the steering wheel. For example, the electric steering system 21 may include a rotation sensor and an electric motor that are not illustrated. The rotation sensor may detect the rotation angle of the steering wheel. The electric motor may control the steering angles of the drive wheels 11L and 11R on the basis of the rotation angle of the steering wheel detected by the rotation sensor. Optionally, the electric steering system 21 may further include an electric motor that outputs drive power to rotate the steering wheel. The driving of the electric steering system 21 may be controlled by the vehicle control apparatus 50.

In the automatic drive mode, the steering angles of the drive wheels 11L and 11R may be controlled using the electric steering system 21.

The vehicle operation-behavior sensor 41 may include at least one sensor that detects an operational state and a behavior of the vehicle 1. For example, the vehicle operation-behavior sensor 41 may include at least one of a vehicle speed sensor, an acceleration sensor, or an angular speed sensor, to acquire data on a behavior of the vehicle 1, such as the vehicle speed, the frontward acceleration rate, the rearward acceleration rate, the lateral acceleration rate, and the yaw rate. For example, the vehicle operation-behavior sensor 41 may include at least one of an accelerator position sensor, a brake stroke sensor, a brake pressure sensor, a steering angle sensor, or an engine revolution sensor, to acquire data on an operational state of the vehicle 1, such as the steering angle of the steering wheel, the steering angles of the drive wheels, the accelerator position, and the braking operation quantity. The vehicle operation-behavior sensor 41 may send the vehicle control apparatus 50 a sensor signal indicating the detected data.

The vehicle position sensor 43 may detect the position of the vehicle 1, and output the result of the detection to the vehicle control apparatus 50. For example, the vehicle position sensor 43 may be a global positioning system (GPS) sensor that receives satellite signals from the GPS satellites. The GPS sensor may send the position of the vehicle 1 on the map information included in the received satellite signals to the navigator 45 and the vehicle control apparatus 50. In place of the GPS sensor, another sensor may be provided to receive satellite signals for identifying the position of the vehicle 1 from other satellite systems.

Optionally, the vehicle position sensor 43 may further include a measurement device that detects the position of the own vehicle on a road. Examples of the measurement device may include an outside-vehicle camera, a light detection and ranging or a laser imaging detection and ranging (LiDAR) device, and a radar sensor.

The navigator 45 may guide the vehicle 1 along a travel route from the current position to a set destination. The navigator 45 may preliminarily store map data including data on a target trajectory. The target trajectory may serve as a reference trajectory for the vehicle 1 traveling on a road in the automatic drive mode. The data on the target trajectory may include a group of target points. The navigator 45 may acquire the data on the current position of the vehicle 1 from the vehicle position sensor 43 and set a travel route from the current position to the set destination. The navigator 45 may output the data on the travel route and the target trajectory to the vehicle control apparatus 50.

The navigator 45 may display various pieces of route-guide information in a visual manner. For example, the navigator 45 may display the current position of the vehicle 1, the travel route, the position of the destination, the distance to the destination, and an estimated arrival time to the destination on the map data.

While the vehicle 1 is traveling in the automatic drive mode, the vehicle control apparatus 50 may control the inverter 33, the brake system 15, and the electric steering system 21 to perform automatic drive control that causes the vehicle 1 to automatically travel along the travel route set by the navigator 45. The vehicle control apparatus 50 may set at least target steering angles of the drive wheels 11L and 11R, and control the steering angles of the drive wheels 11L and 11R on the basis of the target steering angle.

2. Vehicle Control Apparatus

The vehicle control apparatus 50 according to the present example embodiment will now be described.

2-1. Exemplary Configuration

The vehicle control apparatus 50 includes, at least, one or more processors and one or more memories communicably coupled to the one or more processors. The one or more processors include a central processing unit (CPU) or a micro processing unit (MPU). The one or more memories are configured to store various data items. Note that part or the entirely of the vehicle control apparatus 50 may be configured by updatable firmware or a program module to be executed in response to a command from the CPU, for example.

Figure 2:
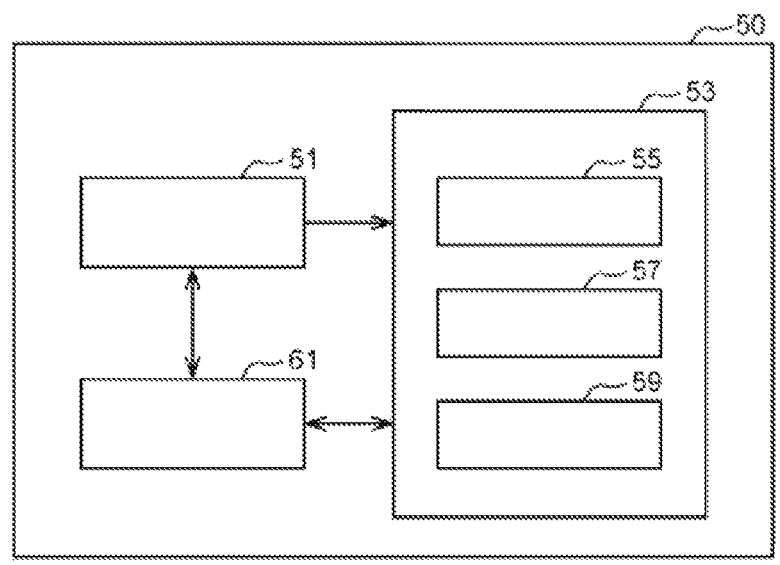
FIG. 2 is a block diagram illustrating an exemplary configuration of the vehicle control apparatus according to one example embodiment of the technology.

FIG. 2 is a block diagram of an exemplary configuration of the vehicle control apparatus 50. The vehicle control apparatus 50 includes a setting unit 51, a control unit 53, and a memory unit 61. It should be noted that these components in the vehicle control apparatus 50 according to the present example embodiment may be implemented by a single processor or a plurality of processors mutually communicable via a communication means such as a controller area network (CAN).

2-1-1. Memory

The memory unit 61 may include a memory, such as a read only memory (ROM) or a random access memory (RAM). The ROM may store programs to be executed by the processor and various parameters used in arithmetic processing. The RAM may store various detection data items acquired by the processor, the results of the arithmetic processing, and the like. Optionally, the memory unit 61 may include a storage medium such as a hard disk drive (HDD), a compact disc (CD), a digital versatile disk (DVD), a solid state drive (SSD), a universal serial bus (USB), a flash drive, or a storage.

2-1-2. Setting Unit

The setting unit 51 sets a target steering angle θt of the drive wheels 11L and 11R to cause the vehicle 1 traveling in the automatic drive mode to move along a target trajectory Ttgt set on the travel route received from the navigator 45. In the present example embodiment, the setting unit 51 may set a predetermined arc At on the basis of the current position of the vehicle 1 (hereinafter referred to as a current position Pa1 or Pa2, or collectively referred to as a current position Pa when no distinction is needed) and a reference point set on the target trajectory Ttgt (hereinafter referred to as a first reference point Pt1 or a second reference point Pt2, or collectively referred to as a reference point Pt when no distinction is needed). The current position of the vehicle 1 may be acquired from the vehicle position sensor 43, and the reference point may be acquired from the navigator 45. The target steering angle θt may be set on the basis of the curvature c of the arc At. For example, the setting unit 51 may set the target steering angle θt in each predetermined calculation cycle set on the basis of the throughput of the processor.

2-1-3. Control Unit

The control unit 53 may perform various arithmetic processes by executing programs stored in the memory unit 61. The control unit 53 may thereby control the operation of each component in the vehicle 1. In the present example embodiment, the control unit 53 may include a motor control section 55, a brake control section 57, and a steering control section 59.

The motor control section 55 may control an operation of the drive motor 35. For example, the motor control section 55 may control electric power supply from the battery 31 to the drive motor 35 and power charging of the battery 31 with electric power generated by the drive motor 35 by controlling the operation of a switching device in the inverter 33. The motor control section 55 may thereby control the output of drive power from the drive motor 35 and electric charging of the battery 31.

The brake control section 57 may control an operation of the brake system 15. For example, the brake control section 57 may control the pressure inside the wheel cylinder in each brake devices 13L and 13R of the drive wheels 11L and 11R by controlling an operation of the hydraulic control unit. The brake control section 57 may thereby control brake force to be applied to the vehicle 1.

The steering control section 59 may control an operation of the electric steering system 21. For example, the steering control section 59 may control the steering angles θ of the drive wheels 11L and 11R by controlling the output of the electric motor in the electric steering system 21. The steering control section 59 may be configured to control at least the steering angles θ of the drive wheels 11L and 11R. Optionally, the steering control section 59 may control the rotation angle of the steering wheel on the basis of the steering angles θ of the drive wheels 11L and 11R.

As described above, the drive mode of the vehicle 1 may be switched between the manual drive mode and the automatic drive mode. The control unit 53 may control the acceleration rate, the deceleration rate, and the steering angle of the vehicle 1 in accordance with the selected drive mode.

For example, in the manual drive mode, the control unit 53 may control each device so that the acceleration or deceleration rate of the vehicle 1 is controlled on the basis of an accelerating operation or a braking operation performed by the driver. For instance, the control unit 53 may control an operation of the drive motor 35 so that the drive power to be applied to the vehicle 1 is controlled on the basis of the accelerator position. The acceleration rate of the vehicle 1 may be thereby controlled on the basis of an accelerating operation performed by the driver. Further, the control unit 53 may control an operation of the brake system 15 so that the brake force to be applied to the vehicle 1 is controlled on the basis of a braking operation quantity. The deceleration rate of the vehicle 1 may be thereby controlled on the basis of a braking operation performed by the driver. Further, the control unit 53 may control an operation of the electric motor so that the steering angles θ of the drive wheels 11L and 11R are controlled on the basis of the rotation angle of the steering wheel while the driver is performing a steering operation. The steering angles θ of the drive wheels 11L and 11R may be thereby controlled on the basis of a steering operation performed by the driver.

In the automatic drive mode, the control unit 53 may control each device so that the vehicle 1 automatically travels along a travel route set by the navigator 45. For example, the control unit 53 may control each device so that the vehicle 1 automatically travels along the target trajectory Ttgt on the travel route set by the navigator 45. The control unit 53 may control an operation of the electric steering system 21 so that the steering angles θ of the drive wheels 11L and 11R become the target steering angle θt set by the setting unit 51. Further, the control unit 53 may control the acceleration rate or the deceleration rate of the vehicle 1 so that the vehicle speed V of the vehicle 1 is maintained at a set speed, for example. The control unit 53 may set a control target value of each device in the same calculation cycle as that of the setting unit 51.

When there is a preceding vehicle, a pedestrian, or an obstacle in front of or around the vehicle 1, the control unit 53 may adjust the travel trajectory or the vehicle speed of the vehicle 1 to avoid a contact with the preceding vehicle, the pedestrian, or the obstacle. However, the following description is made assuming that there is no preceding vehicle nor pedestrian to facilitate the understanding of the technology.

2-2. Exemplary Operation of Vehicle Control Apparatus

Hereinafter, an example process performed by the vehicle control apparatus 50 according to the present example embodiment to control the steering angles θ of the drive wheels 11L and 11R is described as one of exemplary operations of the vehicle control apparatus 50.

2-2-1. Outline of Method of Setting Target Steering Angle

Figure 3:
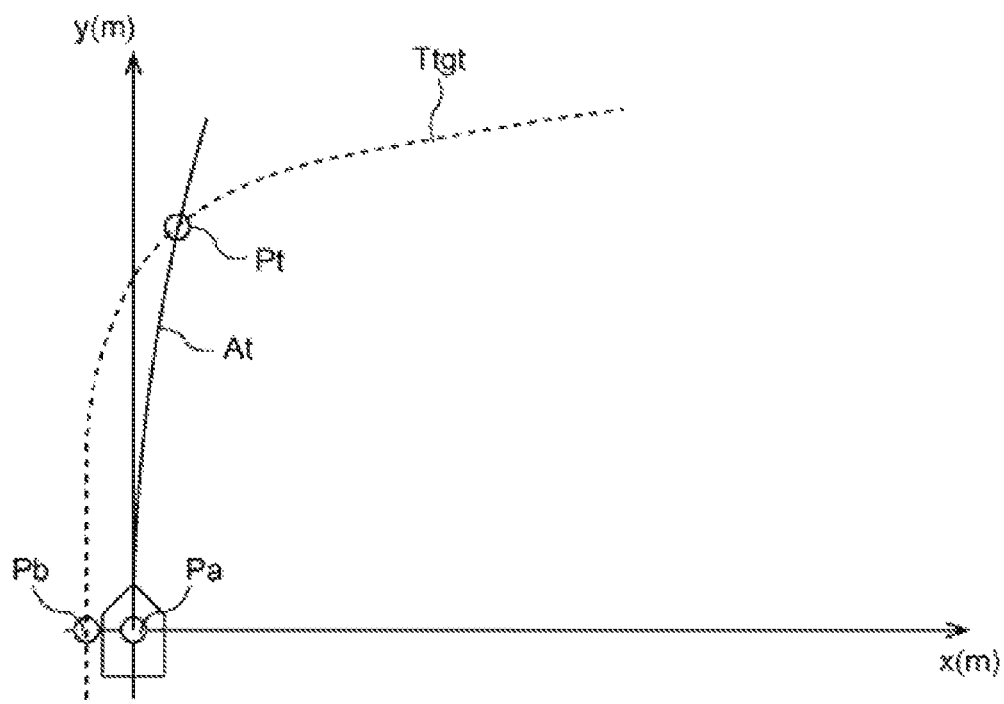
FIG. 3 is a diagram for explaining a method of setting a target steering angle.

First, an example basic method performed by the setting unit 51 to set the target steering angle θt is schematically described with reference to FIG. 3. FIG. 3 illustrates a basic concept of the process for setting the target steering angle θt.

The setting unit 51 may receive the data on the current position Pa of the vehicle 1 from the vehicle position sensor 43 and the data on the target trajectory Ttgt on the travel route received from the navigator 45. The setting unit 51 may set the reference point Pt at a position in front of the vehicle 1 and on the target trajectory Ttgt in accordance with a predetermined criterion. The setting unit 51 may further calculate the arc At having a tangent line that extends in the current advancing direction of the vehicle 1 and passes through the current position Pa of the vehicle 1 and the reference point Pt. Further, the setting unit 51 may set the target steering angle θt of the drive wheels 11L and 11R so that the travel trajectory of the vehicle 1 follows the calculated Arc At having a curvature c.

For example, the setting unit 51 in the vehicle control apparatus 50 according to the present example embodiment calculates an inflection point Pc of the curvature c of the target trajectory Ttgt, and sets the reference point Pt before and after the vehicle 1 passes through the inflection point Pc in accordance with different criteria. For instance, before the vehicle 1 passes through the inflection point Pc on the target trajectory Ttgt, the setting unit 51 sets the first reference point Pt1 before the inflection point Pc. Further, the setting unit 51 sets the first reference point Pt1 and the second reference point Pt2 such that a second distance D2 from the current position Pa2 of the vehicle 1 detected after the vehicle 1 passes through the inflection point Pc to the second reference point Pt2 is longer than a first distance D1 from the current position Pa1 of the vehicle 1 detected before the vehicle 1 passes through the inflection point Pc to the first reference point Pt1 when compared under identical travel conditions. The wording "identical travel conditions" may refer to conditions identical to each other in at least one or all of the vehicle speed, the acceleration rate, the deceleration rate, and the steering angle.

Figure 4:
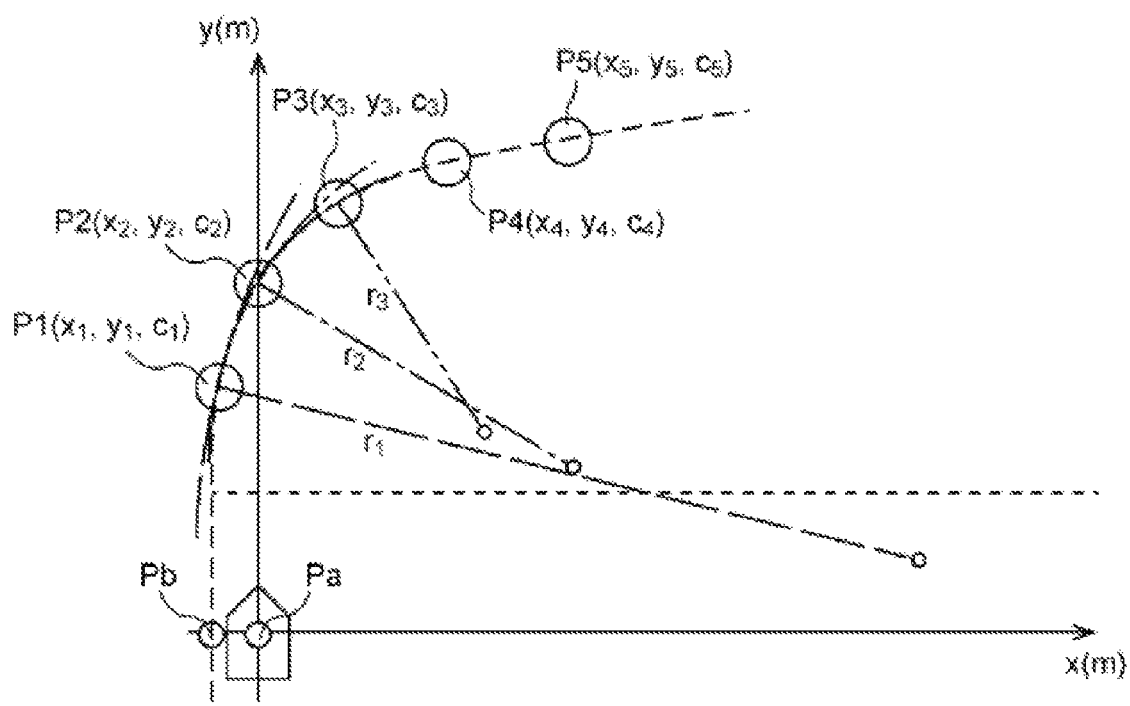
FIG. 4 is a diagram for explaining a method for identifying an inflection point of the curvature of a target trajectory.
Figure 5:
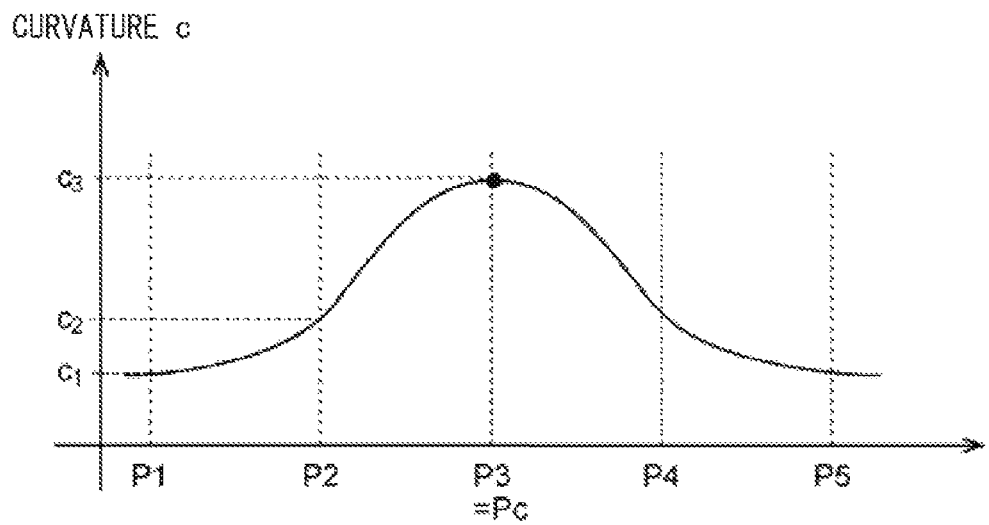
FIG. 5 is a diagram illustrating a change in the curvature of the target trajectory.

FIGS. 4 and 5 illustrate an exemplary method of identifying the inflection point Pc of the curvature c of the target trajectory Ttgt. The setting unit 51 may select any target points from the group of target points consisting of the target trajectory Ttgt received from the navigator 45. In the example illustrated in FIGS. 4 and 5, five target points P1 to P5 may be selected. The setting unit 51 may calculate the coordinates $(x_i, y_i)$ of each of the target points P1 to P5 in a two-dimensional space, and the curvature $c_i$ of the target trajectory Ttgt at each of the target points P1 to P5.

In this example, the two-dimensional space may include the current position Pa of the vehicle 1 as an origin point and a y-axis extending in the advancing direction of the vehicle 1. The curvature $c_i$ of the target trajectory Ttgt at each of the target points P1 to P5 may be included in the data on the target trajectory Ttgt received from the navigator 45, or may be calculated by the setting unit 51 on the basis of the data on the two-dimensional coordinates of the target points consisting of the trajectory Ttgt received from the navigator 45. Note that the method of calculating the curvature $c_i$ should not be limited to a particular method.

The setting unit 51 may then select the target point having the largest curvature c from the target points P1 to P5 having the respective curvatures $c_1$ to $c_5$, and set the selected target point as the inflection point Pc. In the example illustrated in FIGS. 4 and 5, the curvature c may increase from the curvature $c_1$ of the target point P1 to the curvature $c_3$ of the target point P3 (i.e., the radius of curvature may decrease from the radius of curvature $r_1$ to the radius of curvature $r_3$), and then decrease from the curvature $c_3$ of the target point P3 to the curvature $c_5$ of the target point P5. The setting unit 51 may thus set the target point P3 as the inflection point Pc.

The setting unit 51 may set the target point having the largest curvature c as the inflection point Pc only when the largest curvature c is greater than a predetermined value. While the vehicle 1 is traveling on a slight curve, the arc At having a small curvature may be set. Thus, the actual travel trajectory is unlikely to largely deviate inwardly from the curve of the target trajectory Ttgt, and steering fluctuations are unlikely to increase. Accordingly, the number of executions of the process for setting the reference points Pt in accordance with the different criteria is reduced. As a result, the load on the vehicle control apparatus 50 is reduced.

The number of the target points to be selected should not be limited to five. As the number of the selected target points increases, the inflection point Pc of the curvature c may be calculated more accurately. However, the number of the target points should be determined considering that the time required for the calculation process increases as the number of the selected target points increases.

The target points P1 to P5 may be located at any positions. For example, the target points P1 to P5 may be positioned at an equal interval. Positioning the target points P1 to P5 at an equal interval makes it possible to prevent the calculated inflection point Pc from largely deviating from the actual inflection point. For example, the setting unit 51 may set the first target point P1 at a position far from the current position Pa of the vehicle 1 by a predetermined distance. Note that the first target point P1 may be closest to the current position Pa of the vehicle 1. The setting unit 51 may then set the second to fifth target points P2 to P5 at an equal interval. In a case where the current position Pa of the vehicle 1 is not located on the target trajectory Ttgt, the setting unit 51 may set a starting point (hereinafter referred to as a starting point Pb1 or Pb2, or collectively referred to as a starting point Pb when no distinction is needed) at a position on the target trajectory Ttgt and closest to the current position Pa of the vehicle 1. The setting unit 51 may set the first target point P1 at a position far from the starting point Pb, rather than the current position Pa, by a predetermined distance, and set the second to fifth target points P2 to P5 at an equal interval.

In this case, the distance from the starting point Pb to the first target point P1 may be set to any value. For example, the distance from the starting point Pb to the first target point P1 may be set on the basis of a current vehicle speed V of the vehicle 1. Likewise, in a case where the target points P1 to P5 are set at an equal interval, the interval between each two adjacent ones of the target points P1 to P5 may be set on the basis of the current vehicle speed V of the vehicle 1. For example, the distance from the starting point Pb to the first target point P1 and the interval between each two adjacent ones of the target points P1 to P5 may be increased as the current vehicle speed V increases. In this example where the distance from the starting point Pb to the first target point P1 and the interval between each two adjacent ones of the target points P1 to P5 are set in proportion to the vehicle speed V of the vehicle 1, the position of the inflection point Pc may be determined in a range of the target trajectory Ttgt defined on the basis of an estimated travel distance of the vehicle 1. This ensures the process for setting the reference points Pt at positions before and after the inflection point Pc in accordance with the different criteria to be executed.

Figure 6:
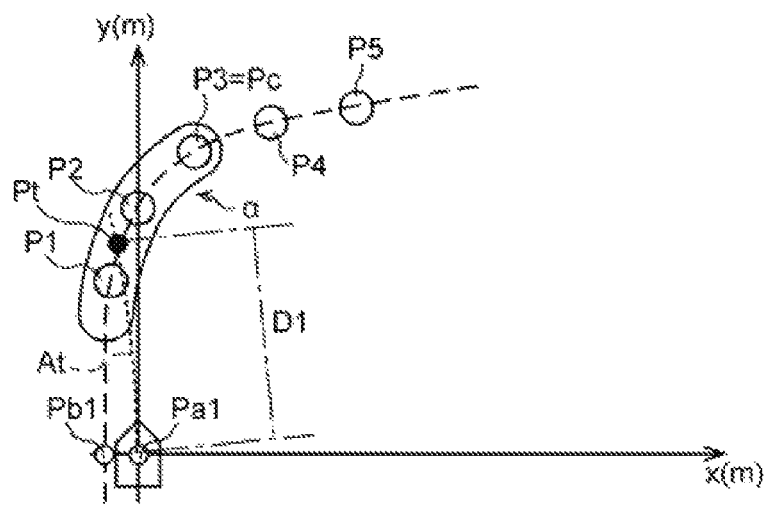
FIG. 6 is a diagram illustrating a position where a reference point is set before the vehicle passes through the inflection point of the curvature of the target trajectory.
Figure 7:
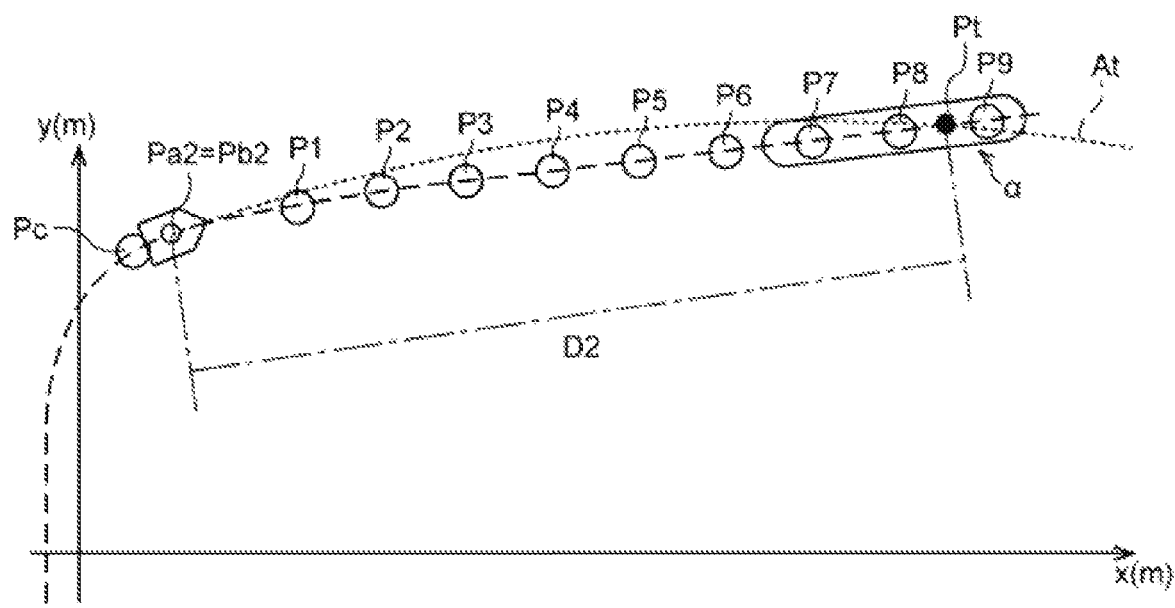
FIG. 7 is a diagram illustrating a position where the reference point is set after the vehicle passes through the inflection point of the curvature of the target trajectory.

FIG. 6 illustrates a range α in which the first reference point Pt1 is to be set before the vehicle 1 passes through the inflection point Pc. FIG. 7 illustrates a range α in which the second reference point Pt2 is to be set after the vehicle 1 passes through the inflection point Pc. In FIG. 6, the first reference point Pt1 may be set within the range α lying at any desired position on the target trajectory Ttgt with respect to the current position Pa1 of the vehicle 1. In FIG. 7, the second reference point Pt2 may be set within the range α lying at any desired position on the target trajectory Ttgt with respect to the current position Pa2 of the vehicle 1. The range α may be, for example but not limited to, a range having a predetermined distance and including a predetermined number of target points. In the example illustrated in FIGS. 6 and 7, the range α may include three target points.

As illustrated in FIG. 6, before the vehicle 1 passes through the inflection point Pc, the range a in which the first reference point Pt1 used to calculate the arc At is set may be set at a position before the inflection point Pc. Accordingly, while the vehicle 1 approaches the inflection point Pc set in front of the vehicle 1, the first reference point Pt1 is unlikely to be set at a position beyond the inflection point where the target trajectory Ttgt has the largest curvature c. This reduces the degree of inward deviation of the actual travel trajectory of the vehicle 1 from the target trajectory Ttgt.

As illustrated in FIGS. 6 and 7, the second distance from the current position Pa2 of the vehicle 1 detected after the vehicle 1 passes through the inflection point Pc (i.e., the starting point Pb2) to the range α including the second reference point Pt2 is longer than the first distance from the current position Pa1 of the vehicle 1 detected before the vehicle 1 passes through the inflection point Pc (i.e., the starting point Pb1) to the range α including the first reference point Pt1. In the present example embodiment, the first reference point Pt1 and the second reference point Pt2 may be set regardless of the vehicle speed V of the vehicle 1 such that the second distance D2 from the current position Pa2 of the vehicle 1 detected after the vehicle 1 passes through the inflection point Pc (i.e., the starting point Pb2) to the second reference point Pt2 is longer than the first distance D1 from the current position Pa1 of the vehicle 1 detected before the vehicle 1 passes through the inflection point Pc (i.e., the starting point Pb1) to the first reference point Pt1 when compared under the identical travel conditions. Accordingly, in a case where the curvature c of the target trajectory Ttgt becomes small after the vehicle 1 passes through the inflection point Pc, the second reference point Pt2 is set at a position farther from the vehicle 1. As a result, the calculated arc At has a small curvature. It is therefore possible to reduce the steering fluctuations by controlling the steering angles θ of the drive wheels 11L and 11R on the basis of the target steering angle θt set in each calculation cycle.

2-2-2. Exemplary Methods of Setting Reference Point

Now described are exemplary methods of setting the first reference point Pt1 and the second reference point Pt2 such that the second distance D2 is longer than the first distance D1 when compared under the identical travel conditions.

First Exemplary Method

In a first exemplary method, the setting unit 51 may set the reference point Pt at an estimated arrival position on the target trajectory Ttgt where the vehicle 1 is estimated to reach in a predetermined unit of time. In this method, the setting unit 51 may use a second unit of time T2 after the vehicle 1 passes through the inflection point Pc, and a first unit of time T1 before the vehicle 1 passes through the inflection point Pc. The second unit of time T2 may be longer than the first unit of time T1. Accordingly, the first reference point Pt1 and the second reference point Pt2 are set such that the second distance D2 is longer than the first distance D1 when compared under the identical travel conditions.

In a case where the reference point Pt is set at the estimated arrival position on the target trajectory Ttgt where the vehicle 1 is estimated to reach in the predetermined unit of time, the distance from the current position Pa (or the starting point Pb) to the reference point Pt may increase as the vehicle speed V increases, and may decrease as the vehicle speed V decreases. In this case, the first unit of time T1 used before the vehicle 1 passes through the inflection point Pc may be set to such a value that the estimated arrival position where the vehicle 1 traveling at the current vehicle speed V is estimated to reach in the first unit of time T1 is positioned before the inflection point Pc on the target trajectory Ttgt. Note that the first unit of time T1 may be set longer than the interval between the calculation cycles of the setting unit 51. For example, in a case where the interval between the calculation cycles of the setting unit 51 is 0.1 seconds, the first unit of time T1 may be set to 0.2 to 1.0 seconds.

Figure 8:
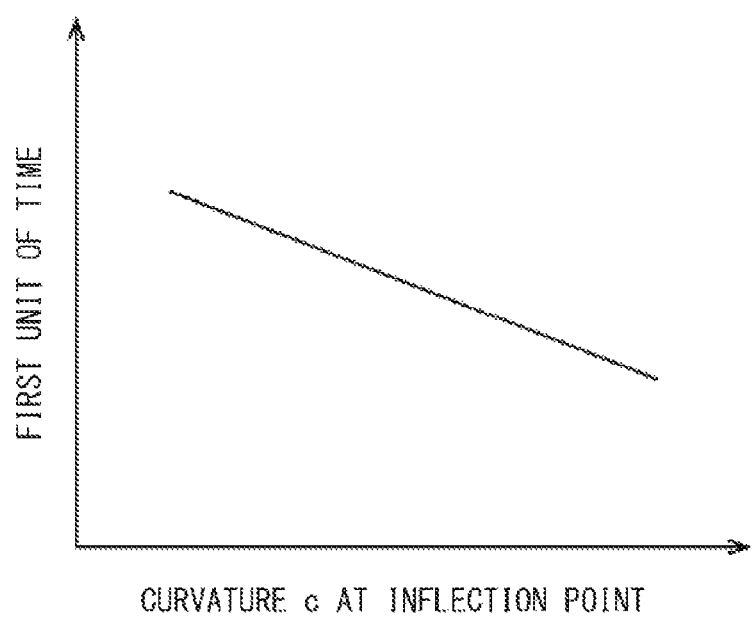
FIG. 8 is a graph illustrating an exemplary relationship between the curvature at the inflection point and a first unit of time for setting the reference point before the inflection point of the target trajectory.

Before the vehicle 1 passes through the inflection point Pc, the setting unit 51 may adjust the position of the first reference point Pt1 on the basis of the curvature c at the inflection point Pc. For example, the setting unit 51 may adjust the position of the first reference point Pt1 so that the first distance D1 becomes shorter as the curvature c at the inflection point Pc increases, whereas becomes longer as the curvature c at the inflection point Pc decreases, when compared under the identical conditions. For example, as illustrated in FIG. 8, the setting unit 51 may adjust the position of the first reference point Pt1 so that the first distance D1 becomes shorter as the curvature c at the inflection point Pc increases. Alternatively, the setting unit 51 may set a coefficient that becomes smaller as the curvature c at the inflection point increases, and multiply the first distance D1 to the first reference point Pt1 calculated on the basis of the vehicle speed V as described above by the coefficient. Accordingly, in a case where the curvature c at the inflection point Pc is large, i.e., if the curve is sharp, the first reference point Pt1 is set at a position closer to the vehicle 1. It is therefore possible to reduce the degree of inward deviation of the actual travel trajectory of the vehicle 1 from the curve of the target trajectory Ttgt.

In the first exemplary method, the second unit of time T2 used after the vehicle 1 passes through the inflection point Pc may be longer than the first unit of time T1. Accordingly, in a case where the curvature c of target trajectory Ttgt becomes small after the vehicle 1 passes through the inflection point Pc, the second reference point Pt2 is set at a position farther from the vehicle 1. As a result, the arc At used to calculate the target steering angle θt has a small curvature. Accordingly, it is possible to reduce steering fluctuations.

When detecting the presence of a second inflection point at a position beyond a first inflection point, the setting unit 51 may switch the predetermined unit of time used to set the reference point Pt from the second unit of time T2 to the first unit of time T1 at an appropriate boundary position between the two inflection points. For example, before the vehicle 1 reaches a middle point between the two inflection points, the setting unit 51 may determine that the vehicle 1 has passed through the first inflection point and use the second unit of time T2. In contrast, after the vehicle 1 passes through the middle point, the setting unit 51 may determine that the vehicle 1 has not passed through the second inflection point yet and use the first unit of time T1.

Alternatively, when identifying the inflection point Pc of the curvature c of the target trajectory Ttgt, the setting unit 51 may set the reference points Pt in predetermined ranges lying before and after the inflection point Pc on the basis of different criteria. Accordingly, it is possible to set the reference points Pt on the basis of the different criteria only in a situation where it is easy to reduce the degree of inward deviation of the actual travel trajectory of the vehicle 1 from the curve of the target trajectory Ttgt and where it is easy to reduce steering fluctuations. As a result, the load on the vehicle control apparatus 50 is reduced.

Second Exemplary Method

In a second exemplary method, the setting unit 51 may set the first reference point Pt1 or the second reference point Pt2 using a coefficient at least one of before or after the vehicle 1 passes through the inflection point Pc. The coefficient may be set to such a value that the second distance D2 is longer than the first distance D1 when compared under the identical travel conditions. For example, both before and after the vehicle 1 passes through the inflection point Pc, the setting unit 51 may calculate an estimated arrival distance through which the vehicle 1 is estimated to travel in a predetermined unit of time. In this example, the same predetermined unit of time may be used before and after the vehicle 1 passes through the inflection point Pc. The setting unit 51 may then multiply the estimated arrival distance by the coefficient. The setting unit 51 may set the first reference point Pt1 or the second reference point Pt2 at a position corresponding to the resultant estimated arrival distance.

In a case where the estimated arrival distance is multiplied by the coefficient only before the vehicle 1 passes through the inflection point Pc, the coefficient may be set to an appropriate value less than 1, for example. In contrast, in a case where the estimated arrival distance is multiplied by the coefficient only after the vehicle 1 passes through the inflection point Pc, the coefficient may be set to an appropriate value greater than 1. In a case where the estimated arrival distance is multiplied by the coefficient both before and after the vehicle 1 passes through the inflection point Pc, a second coefficient used after the vehicle 1 passes through the inflection point Pc may be greater than a first coefficient used before the vehicle 1 passes through the inflection point Pc. Accordingly, the first reference point Pt1 and the second reference point Pt2 are set such that the second distance D2 is longer than the first distance D1 when compared under the identical travel conditions. In a case where the curvature c of the target trajectory Ttgt becomes small after the vehicle 1 passes through the inflection point Pc, the second reference point Pt2 is set at a position farther from the vehicle 1. As a result, the arc AT used to calculate the target steering angle θt has a small curvature. It is therefore possible to reduce steering fluctuations.

Alternatively, the setting unit 51 may perform addition or subtraction of a predetermined distance, instead of multiplication by the coefficient, in the second exemplary method. For example, the setting unit 51 may add the predetermined distance to the estimated arrival distance or subtract the predetermined distance from the estimated arrival distance before the vehicle 1 passes through the inflection point Pc. Alternatively, the setting unit 51 may add the predetermined distance to the estimated arrival distance or subtract the predetermined distance from the estimated arrival distance before and after the vehicle 1 passes through the inflection point Pc. In this case, the predetermined distance to be added or subtracted to/from the estimated arrival distance may be set greater after the vehicle 1 passes through the inflection point Pc than before the vehicle 1 passes through the inflection point Pc. Note that the predetermined distance may be a positive value or a negative value. Also through the addition or subtraction of the predetermined distance, it is possible to set the reference points Pt such that the second distance D2 is longer than the first distance D1 when compared under the identical travel conditions.

Alternatively, the estimated arrival distance per predetermined unit of time may be replaced with a constant distance independent of the vehicle speed V in the second exemplary method. The constant distance may be multiplied by the coefficient, or the predetermined distance may be added or subtracted to/from the constant distance. Also in this case, it is possible to set the first reference point Pt1 and the second reference point Pt2 such that the second distance D2 is longer than the first distance D1 when compared under the identical travel conditions.

Also in the second exemplary method, the setting unit 51 may adjust the position of the first reference point Pt1 on the basis of the curvature c at the inflection point Pc before the vehicle 1 passes through the inflection point Pc. Further, when detecting the presence of the second inflection point at a position beyond the first inflection point, the setting unit 51 may switch the predetermined unit of time used to set the reference point Pt from the second unit of time T2 to the first unit of time T1 at an appropriate boundary position between the two inflection points. Still further, when identifying the inflection point Pc of the curvature c of the target trajectory Ttgt, the setting unit 51 may set the reference points Pt in the predetermined ranges lying before and after the inflection point Pc on the basis of the different criteria.

Third Exemplary Method

In a third exemplary method, the setting unit 51 may set the reference point Pt at a position on the target trajectory Ttgt and far from the current position Pa of the vehicle 1 (i.e., the starting point Pb) by a predetermined distance. The predetermined distance may be a constant independent of the vehicle speed V. For example, the setting unit 51 may set a first distance D1, which is the predetermined distance used before the vehicle 1 passes through the inflection point Pc, and a second distance D2, which is the predetermined distance used after the vehicle 1 passes through the inflection point Pc. The second distance D2 may be set longer than the first distance D1. Accordingly, it is possible to set the first reference point Pt1 and the second reference point Pt2 such that the second distance D2 is longer than the first distance D1 without performing the multiplication by the coefficient, the addition of the predetermined distance, nor the subtraction of the predetermined distance.

Also in the third exemplary method, the setting unit 51 may adjust the position of the first reference point Pt1 on the basis of the curvature c at the inflection point Pc before the vehicle 1 passes through the inflection point Pc. Further, when detecting the presence of the second inflection point at a position beyond any inflection point, the setting unit 51 may switch the predetermined distance used to set the reference point Pt from the second distance D2 to the first distance D1 at an appropriate boundary position between the two inflection points. Still further, when identifying the inflection point Pc of the curvature c of the target trajectory Ttgt, the setting unit 51 may set the reference points Pt in the predetermined ranges lying before and after the inflection point Pc on the basis of the different criteria.

2-3. Steering Control Process

Figure 9:
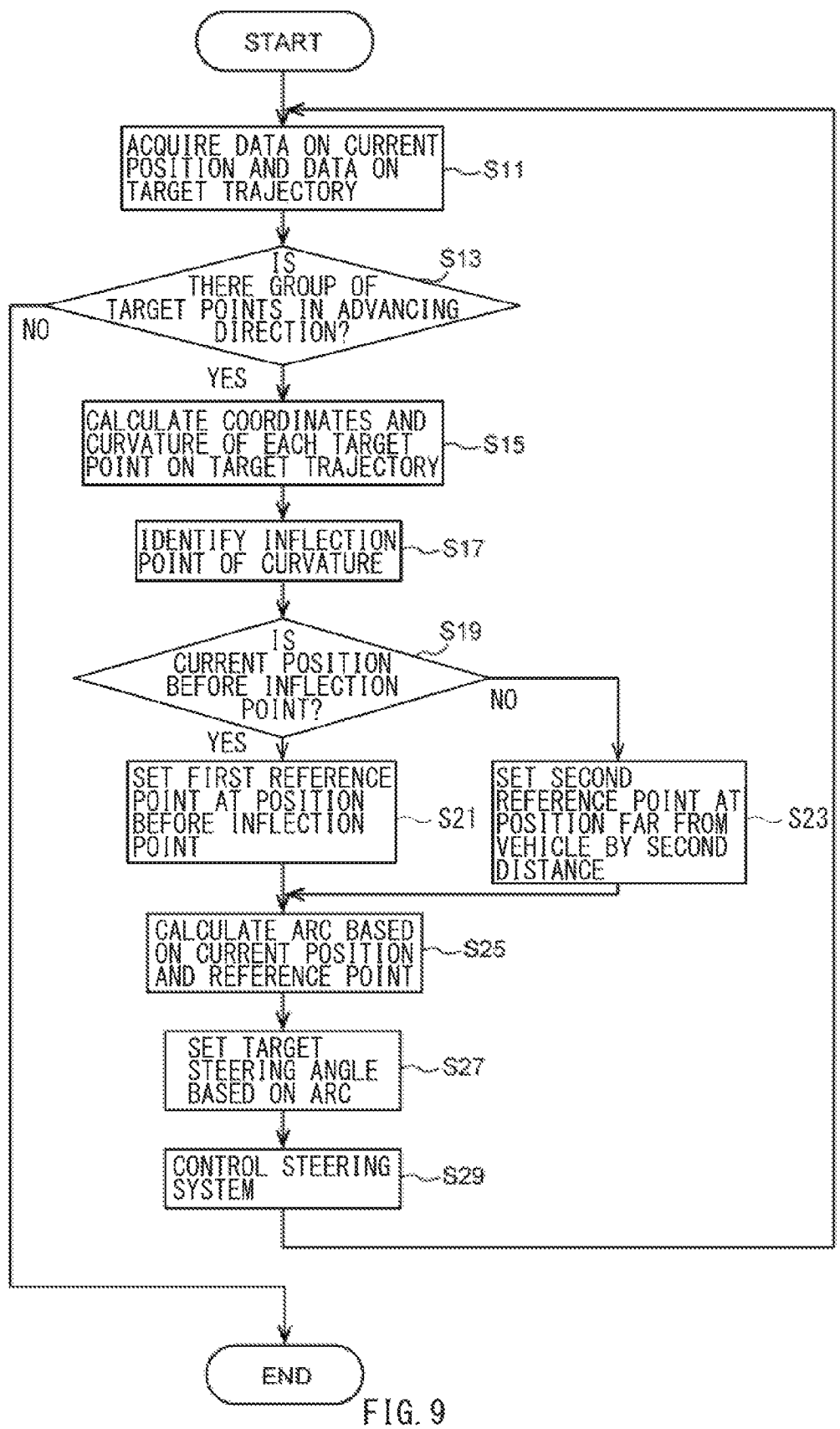
FIG. 9 is a flowchart illustrating a steering control process performed by the vehicle control apparatus according to one example embodiment of the technology.

An exemplary steering control process performed by the vehicle control apparatus 50 of the vehicle 1 will now be described with reference to a flowchart in FIG. 9.

First, the setting unit 51 may acquire the data on the current position Pa of the vehicle 1 and the data on the target trajectory Ttgt from the vehicle position sensor 43 and the navigator 45 (Step S11). Thereafter, the setting unit 51 may determine whether there is a group of target points consisting of the target trajectory Ttgt in the advancing direction of the vehicle 1 (Step S13). In this step, the setting unit 51 may determine whether the vehicle 1 is automatically traveling along a travel route in the automatic drive mode and whether the vehicle 1 is traveling before the destination. If there is no group of target points (Step S13: NO), the setting unit 51 may end the routine.

In contrast, if there is the group of target points (Step S13: YES), the setting unit 51 may select the target points P1 to P5 from the group of target points consisting of the target trajectory Ttgt. The setting unit 51 may then calculate the coordinates $(x_i, y_i)$ of each of the target points P1 to P5 in the two-dimensional space, and the curvature c at each of the target points P1 to P5 (Step S15). As described above, the inflection point Pc of the curvature c may be calculated more accurately as the number of the selected target points increases. However, the number of the target points should be determined considering that the time required for the calculation process increases as the number of the selected target points increases. The curvature c at each of the target points P1 to P5 may be included in the data on the target trajectory Ttgt or may be calculated on the basis of the two-dimensional coordinates of the target points consisting of the target trajectory Ttgt.

Thereafter, the setting unit 51 may select the target point having the largest curvature c from the target points P1 to P5 and the selected target point as the inflection point Pc (Step S17). In this case, the setting unit 51 may set the target point having the largest curvature c as the inflection point Pc only when the curvature c is greater than a predetermined value, as described above. This reduces the number of executions of the process for setting the reference points Pt in accordance with the different criteria. As a result, the load on the vehicle control apparatus 50 is reduced. Although not illustrated, if there is no inflection point Pc having a curvature c greater than the predetermined value, the setting unit 51 may set the reference point Pt in accordance with a predetermined criterion regardless of whether or not the vehicle has passed through the inflection point Pc. In this case, the process may then proceed to Step S25.

If the inflection point Pc is identified in Step S17, the setting unit 51 may determine whether the current position Pa of the vehicle 1 is positioned before the inflection point Pc (Step S19). If the current position Pa is positioned before the inflection point Pc (Step S19: YES), the setting unit 51 may set the first reference point Pt1 at a position before the inflection point Pc (Step S21). In contrast, if the current position Pa is positioned after the inflection point Pc (Step S19: NO), the setting unit 51 may set the second reference point Pt2 at such a position that the second distance D2 from the current position Pa2 after the vehicle 1 passes through the inflection point Pc to the second reference point Pt2 is longer than the first distance D1 from the current position Pa1 before the vehicle 1 passes through the inflection point Pc to the first reference point Pt1 set before the vehicle 1 passes through the inflection point Pc when compared under the identical travel conditions (Step S23).

In the first exemplary method described above, for example, before the vehicle 1 passes through the inflection point Pc, the setting unit 51 may set the first reference point Pt1 at the estimated arrival position on the target trajectory Ttgt where the vehicle 1 traveling at the current vehicle speed V is estimated to reach in the first unit of time T1, which is longer than the interval between the calculation cycles. The estimated arrival position may be set before the inflection point Pc (Step S21). In contrast, after the vehicle 1 passes through the inflection point Pc, the setting unit 51 may set the second reference point Pt2 at the estimated arrival position on the target trajectory Ttgt where the vehicle 1 traveling at the current vehicle speed V is estimated to reach in the second unit of time T2, which is longer than the first unit of time T1 (Step S23).

In the second exemplary method described above, before the vehicle 1 passes through the inflection point Pc, the setting unit 51 may calculate the estimated arrival position on the target trajectory Ttgt where the vehicle 1 traveling at the current vehicle speed V is estimated to reach in the predetermined unit of time, which is longer than the interval between the calculation cycles. The estimated arrival position may be set before the inflection point Pc. The setting unit 51 may then set the first reference point Pt1 at the estimated arrival position (Step S21). Further, after the vehicle 1 passes through the inflection point Pc, the setting unit 51 may calculate the estimated arrival distance through which the vehicle 1 traveling at the current vehicle speed V is estimated to travel in the same predetermined unit of time. The setting unit 51 may multiply the estimated arrival distance by the coefficient greater than 1. The setting unit 51 may then set the second reference point Pt2 at a position corresponding to the resultant estimated arrival distance (Step S23). Alternatively, before the vehicle 1 passes through the inflection point Pc, the setting unit 51 may calculate the estimated arrival distance through which the vehicle 1 is estimated to travel in the predetermined unit of time. The setting unit 51 may then multiply the estimated arrival distance by the coefficient less than 1. The setting unit 51 may set the first reference point Pt1 at a position corresponding to the resultant estimated arrival distance (Step S21). Further, after the vehicle 1 passes through the inflection point Pc, the setting unit 51 may calculate the estimated arrival distance through which the vehicle 1 is estimated to travel in the same predetermined unit of time. The setting unit 51 may multiply the estimated arrival distance by the coefficient greater than 1. The setting unit 51 may then set the second reference point Pt2 at a position corresponding to the resultant estimated arrival distance. Still alternatively, the setting unit 51 may calculate the estimated arrival distance through the multiplication by the coefficient in each of Step S21 and Step S23 to set the first reference point Pt1 and the second reference point Pt2. In this case, the coefficient used in Step S23 may be set greater than the coefficient used in Step S21. Yet alternatively, the setting unit 51 may perform addition or subtraction of the predetermined distance in place of multiplication by the coefficient in Step S21 and Step S23.

In the third exemplary method, before the vehicle 1 passes through the inflection point Pc, the setting unit 51 may set the first reference point Pt1 at a position far from the current position Pa1 of the vehicle 1 (i.e., the starting point Pb1) by the first distance D1 and before the inflection point Pc on the target trajectory Ttgt (Step S21). The first distance D1 may be a constant independent of the vehicle speed V. In contrast, after the vehicle 1 passes through the inflection point Pc, the setting unit 51 may set the second reference point Pt2 at a position on the target trajectory Ttgt and far from the current position Pa2 of the vehicle 1 (i.e., the starting point Pb2) by the second distance D2 (Step S23). The second distance D2 may be longer than the first distance D1 and may be a constant independent of the vehicle speed V.

In any of the first to third exemplary methods, before the vehicle 1 passes through the inflection point Pc, the setting unit 51 may adjust the position of the first reference point Pt1 on the basis of the curvature c at the inflection point Pc in Step S21.

After the first reference point Pt1 and the second reference point Pt2 are set in Steps S21 and S23, the setting unit 51 may calculate the arc At having a tangent line that extends in the current advancing direction of the vehicle 1 and passes through the current position Pa1 of the vehicle 1 and the first reference point Pt1, or the arc At having a tangent line that extends in the current advancing direction of the vehicle 1 and passes through the current position Pa2 of the vehicle 1 and the second reference point Pt2 (Step S25).

Thereafter, the setting unit 51 may set the target steering angle θt of the drive wheels 11L and 11R so that the travel trajectory has the curvature of the calculated arc At (Step S27). For example, the setting unit 51 may calculate a steering angle which allows the vehicle 1 to travel on the calculated arc At, and set the calculated steering angle as the target steering angle θt. For instance, the setting unit 51 may set the target steering angle θt on the basis of the radius of curvature r of the calculated arc At and the current vehicle speed V of the vehicle 1, referring to a map on the target steering angle θt determined on the basis of the radius of curvature r of the arc At and the vehicle speed V. As the vehicle speed V increases, the centrifugal force may increase. Thus, when the vehicle 1 is caused to travel on the single arc At, the target steering angle θt may be increased as the vehicle speed V increases.

Thereafter, the steering control section 59 in the control unit 53 may control the electric steering system 21 so that the steering angles of the drive wheels 11L and 11R become the target steering angle θt (Step S29). The process may then return to Step S11, and the subsequent steps described above may be repeated.

3. Exemplary Effects of Vehicle Control Apparatus

According to the vehicle control apparatus 50 according to the example embodiments described above, the setting unit 51 calculates the arc At having the tangent line that extends in the advancing direction of the vehicle 1 and passes through the current position Pa of the vehicle 1 and the reference point Pt set on the target trajectory Ttgt. Further, the setting unit 51 sets the target steering angle θt assuming that the vehicle 1 travels on the arc At. In this case, the setting unit 51 identifies the inflection point Pc of the curvature c of the target trajectory Ttgt. Before the vehicle 1 passes through the inflection point Pc of the curvature c at the inflection point Pc, the setting unit 51 sets the first reference point Pt1 at a position before the inflection point Pc. Accordingly, the first reference point Pt1 is unlikely to be set at a position beyond the inflection point Pc of the curvature c of the target trajectory Ttgt. It is therefore possible to reduce the degree of inward deviation of the actual travel trajectory from the curve of the target trajectory Ttgt while the vehicle 1 is passing through the curve.

Further, the setting unit 51 sets the second reference point Pt2 at such a position that the second distance D2 from the current position Pa2 of the vehicle 1 detected after the vehicle 1 passes through the inflection point Pc to the second reference point Pt2 is longer than the first distance D1 from the current position Pa1 of the vehicle 1 detected before the vehicle 1 passes through the inflection point Pc to the first reference point Pt1 when compared under the identical travel conditions. Accordingly, in a case where the curvature c of the target trajectory Ttgt becomes small after the vehicle 1 passes through the inflection point Pc, the setting unit 51 sets the second reference point Pt2 at a position farther from the vehicle 1. As a result, the calculated arc At has a small curvature. It is therefore possible to reduce steering fluctuations by controlling the steering angles θ of the drive wheels 11L and 11R on the basis of the target steering angle θt set in each calculation cycle.

Further, before the vehicle 1 passes through the inflection point Pc, the setting unit 51 may adjust the position of the first reference point Pt1 on the basis of the curvature c at the inflection point Pc. Accordingly, in a case where the curvature c at the inflection point Pc is large, that is, in a case where the curve is sharp, the first reference point Pt1 is set at a position closer to the vehicle 1. It is therefore possible to reduce the degree of inward deviation of the actual travel trajectory of the vehicle 1 from the curve of the target trajectory Ttgt.

Further, the setting unit 51 may set the reference point Pt at the estimated arrival position on the target trajectory Ttgt where the vehicle 1 is estimated to reach in the predetermined unit of time. This allows the reference point Pt to be set farther from the vehicle 1 as the vehicle speed V increases. It is therefore possible to reduce steering fluctuations due to the arc At having a large curvature.

In the above description, some example embodiments of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made by the persons skilled in the art without departing from the scope of the technology. The technology is intended to include such modifications and alterations in so far as they fall within the scope of the appended claims or the equivalents thereof.

For example, in at least one of the foregoing example embodiments, the target steering angle θt may be determined by setting a single reference point Pt and calculating a single arc At; however, the technology should not be limited to the embodiments described above. Alternatively, two reference points including a reference point A and a reference point B may be set, and two arcs may be generated on the basis of the respective reference points A and B. In this case, the indicated value of the target steering angle may be set on the basis of the respective target steering angles determined using the arcs. Also in this case, the reference point A may be set at such a position that the second distance D2 set after the vehicle 1 passes through the inflection point Pc is longer than the first distance D1 set before the vehicle 1 passes through the inflection point Pc when compared under the identical travel conditions on the basis of the reference points A set before and after the vehicle 1 passes through the inflection point Pc. Likewise, the reference point B may be set at such a position that the second distance D2 set after the vehicle 1 passes through the inflection point Pc is longer than the first distance D1 set before the vehicle 1 passes through the inflection point Pc when compared under the identical travel conditions on the basis of the reference points B set before and after the vehicle 1 passes through the inflection point Pc.

Accordingly, the reference point A or B is unlikely to be set at a position beyond the inflection point Pc of the curvature c of the target trajectory Ttgt. It is therefore possible to reduce the degree of inward deviation of the actual travel trajectory of the vehicle 1 from the curve of the target trajectory Ttgt while the vehicle 1 is passing through the curve. Further, in a case where the curvature c of the target trajectory Ttgt becomes small after the vehicle 1 passes through the inflection point Pc, the reference points A and B may be set farther from the vehicle 1. As a result, the arcs At calculated on the basis of the respective reference points A and B each have a small curvature. Accordingly, it is possible to reduce steering fluctuations by controlling the steering angles θ of the drive wheels 11L and 11R on the basis of the target steering angle θt set in each calculation cycle.

According to the foregoing example embodiments of the technology, it is possible to reduce the deviation of the actual travel trajectory from the target trajectory while the vehicle is traveling on a curve, and thus to reduce steering fluctuations.

The setting unit 51 in the vehicle control apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the setting unit 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the setting unit 51 in the vehicle control apparatus 50 illustrated in FIG. 2.

The invention claimed is:

1. A vehicle control apparatus to be applied to a vehicle comprising:
one or more processors configured to:
set, before the vehicle passes through an inflection point of a curvature of a target trajectory, a first reference point on the target trajectory at a position before the inflection point, and set a target steering angle on a basis of a curvature of an arc passing through a first position of the vehicle and the first reference point, wherein the first position is a position of the vehicle detected before the vehicle passes through the inflection point;
set, after the vehicle passes through the inflection point, a second reference point on the target trajectory at a position so that a second distance from a second position of the vehicle, wherein the second position is a position of the vehicle detected after the vehicle passes through the inflection point to the second reference point is longer than a first distance from the first position of the vehicle to the first reference point when compared under identical travel conditions, the identical travel conditions being identical to each other in at least one of a vehicle speed, an acceleration rate, a deceleration rate, or a steering angle, and set the target steering angle on a basis of a curvature of an arc passing through the second position of the vehicle and the second reference point;
control the steering angle on a basis of the target steering angle; and
one or more memories communicably coupled to the one or more processors.

2. The vehicle control apparatus according to claim 1, wherein
the one or more processors are configured to:
set, before the vehicle passes through the inflection point, the first reference point at an estimated arrival position on the target trajectory where the vehicle is estimated to reach in a first predetermined unit of time; and
set, after the vehicle passes through the inflection point, the second reference point at an estimated arrival position on the target trajectory where the vehicle is estimated to reach in a second predetermined unit of time, the second predetermined unit of time being longer than the first predetermined unit of time.

3. The vehicle control apparatus according to claim 1, wherein,
at least one of before or after the vehicle passes through the inflection point, the one or more processors are configured to set the first reference point or the second reference point using a coefficient, the coefficient being set to such a value that the second distance is longer than the first distance when compared under the identical travel conditions.

4. The vehicle control apparatus according to claim 3, wherein
the one or more processors are configured to set the first reference point or the second reference point on a basis of an estimated arrival position on the target trajectory where the vehicle is estimated to reach in a predetermined unit of time.

5. The vehicle control apparatus according to claim 1, wherein,
at least one of before or after the vehicle passes through the inflection point, the one or more processors are configured to set the first reference point or the second reference point by performing addition or subtraction of a predetermined distance, the predetermined distance being set to such a value that the second distance is longer than the first distance when compared under the identical travel conditions.

* * * * *